United States Patent
Schaal

(10) Patent No.: US 7,699,375 B2
(45) Date of Patent: Apr. 20, 2010

(54) GLOVE COMPARTMENT FOR A MOTOR VEHICLE

(75) Inventor: Falk Schaal, Alpirsbach (DE)

(73) Assignee: Fischer Automotive Systems GmbH, Horb (DE)

( * ) Notice: Subject to any disclaimer, the term of this patent is extended or adjusted under 35 U.S.C. 154(b) by 223 days.

(21) Appl. No.: 11/718,269

(22) PCT Filed: Nov. 24, 2005

(86) PCT No.: PCT/EP2005/012552

§ 371 (c)(1),
(2), (4) Date: Apr. 30, 2007

(87) PCT Pub. No.: WO2006/056431

PCT Pub. Date: Jun. 1, 2006

(65) Prior Publication Data

US 2009/0058123 A1    Mar. 5, 2009

(30) Foreign Application Priority Data

Nov. 24, 2004  (DE) .................. 20 2004 018 170 U

(51) Int. Cl.
*B60R 13/00*    (2006.01)
(52) U.S. Cl. ................. 296/37.12; 296/37.8; 296/24.34
(58) Field of Classification Search .............. 296/37.12, 296/24.34, 37.8
See application file for complete search history.

(56) References Cited

U.S. PATENT DOCUMENTS

| 7,048,311 | B2 | 5/2006 | Sawatani et al. |
| 2004/0140685 | A1* | 7/2004 | Bieck et al. ............. 296/37.12 |
| 2004/0168487 | A1 | 9/2004 | Sawatani et al. |

FOREIGN PATENT DOCUMENTS

| CN | 1517732 | 7/2004 |
| DE | 7000 572 | 4/1970 |
| DE | 19 55 057 | 5/1971 |
| DE | 3307843 | * 9/1984 |
| DE | 695 03 727 | 12/1998 |
| DE | 198 54 120 | 5/2000 |
| DE | 199 51 968 | 5/2001 |
| DE | 100 63 190 | 6/2002 |
| EP | 0 701 923 | 3/1996 |
| EP | 1 153 796 | 11/2001 |
| FR | 2 781 441 | 1/2000 |

* cited by examiner

*Primary Examiner*—Dennis H Pedder
*Assistant Examiner*—Pinel E Romain
(74) *Attorney, Agent, or Firm*—Michael J. Striker

(57) ABSTRACT

The invention relates to a glove compartment (3) for a motor vehicle. In order to provide a glove compartment of such a kind that allows the driver better access, the invention proposes that the glove compartment (3) have a pivotal mounting by means of which the glove compartment (3) can be pivoted towards the driver's side of the motor vehicle.

7 Claims, 3 Drawing Sheets

GLOVE COMPARTMENT FOR A MOTOR VEHICLE

CROSS-REFERENCE TO RELATED APPLICATION

The invention described and claimed hereinbelow is also described in German Patent Application DE 20 2004 018 170.3 filed on Nov. 24, 2004. This German Patent Application, whose subject matter is incorporated here by reference, provides the basis for a claim of priority of invention under 35 U.S.C. 119(a)-(d).

BACKGROUND OF THE INVENTION

The present invention relates to a glove compartment for a motor vehicle.

Glove compartments in motor vehicles not only are known but are generally customary. They are usually located on the passenger side of the motor vehicle in or underneath the instrument panel and in front of the passenger seat. Because the glove compartment is located on the passenger side, it is difficult for the driver to access.

SUMMARY OF THE INVENTION

The invention is based on the problem of providing, with little outlay, a glove compartment allowing the driver better access.

The problem is solved, in accordance with the invention, by the features of claim 1. The glove compartment according to the invention, having the features of claim 1, has a pivotal mounting by means of which it is mounted so as to be pivotable towards the driver's side. It is not necessary, in the process, for the glove compartment to be pivotable to the driver's side to an extent such that the driver has a frontal view of or into the glove compartment. Even a comparatively small pivot angle considerably improves driver access and also the driver's view into the glove compartment. The invention improves the ergonomics of the glove compartment for the driver. The pivotal mounting can be produced by simple means and, therefore, economically and, in addition, sturdily. There is no additional space requirement because the installation space provided for the glove compartment is sufficient.

In a development of the invention, the glove compartment is so arranged that, starting from the position pivoted towards the driver, it can be pivoted into a closed position. For the purpose, the glove compartment is so pivoted that its opening "disappears" in the instrument panel. In the closed position, the opening of the glove compartment is not accessible from the interior space of the motor vehicle. When in the closed position, the opening of the glove compartment can have been pivoted towards the middle of the vehicle or towards the outside. It is also possible for the glove compartment to pivot further so that its opening faces towards the front, away from the interior space of the vehicle. In the closed position, the opening of the glove compartment is preferably covered by a fixed wall in the instrument panel so that no articles can fall out of the glove compartment even under bumpy driving conditions.

In a development of the invention, a sub-division of the glove compartment into a fixed part and a part that can be pivoted towards the driver's side is provided. The installation space customarily provided for a glove compartment in a motor vehicle is accordingly used for a pivotable glove compartment for the driver and a fixed glove compartment for the passenger.

In an embodiment of the invention, there is provided a cover for closing over the glove compartment. Various arrangements are possible in this regard. A cover can close over the entire glove compartment. The cover can also close over the fixed glove compartment or the pivotable glove compartment. It is also possible for the pivotable glove compartment and the fixed glove compartment each to have its own cover.

The invention will be explained hereinbelow in greater detail with reference to examples of embodiments shown in the drawings.

BRIEF DESCRIPTION OF THE DRAWINGS

FIGS. 1A, 1B, 2A, 2B, 3A, 3B are perspective views, as seen by a driver, of a central console and a motor vehicle instrument panel having a glove compartment on a passenger side, wherein FIGS. 1A, 2A and 3A are views showing the glove compartment in a home position, and FIGS. 1B, 2B and 3B are views showing the glove compartment in a position towards the driver's side.

DESCRIPTION OF THE PREFERRED EMBODIMENTS

Figure 1A:
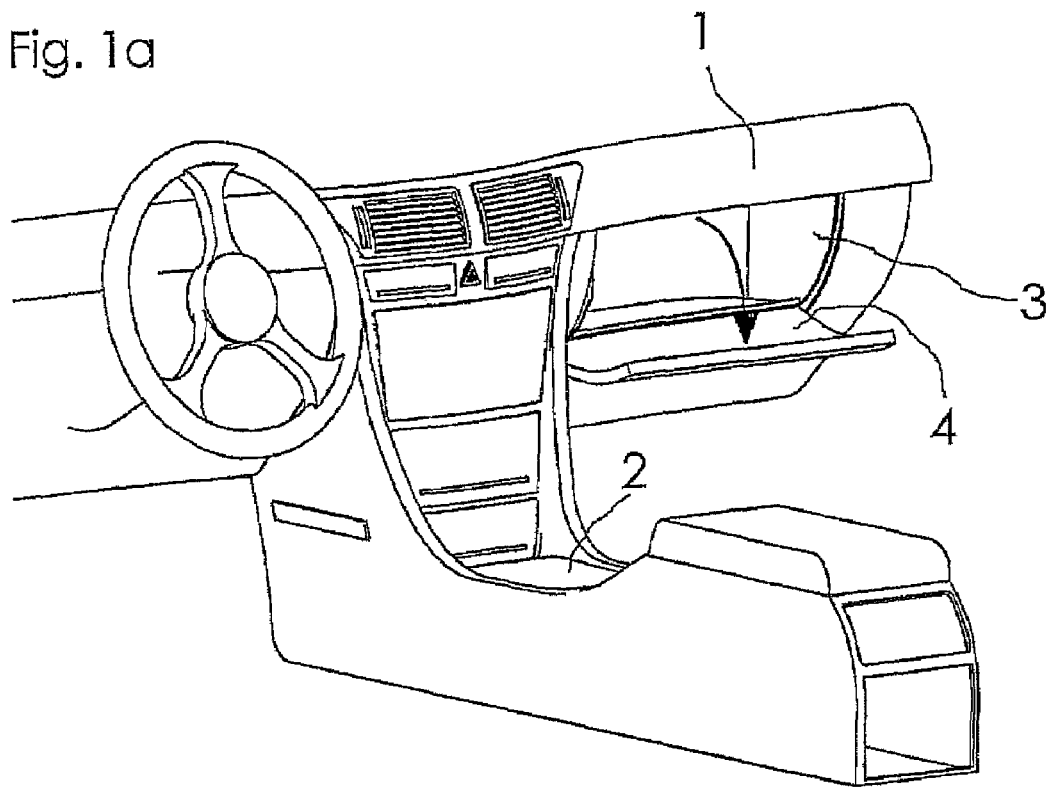
Figure 1B:
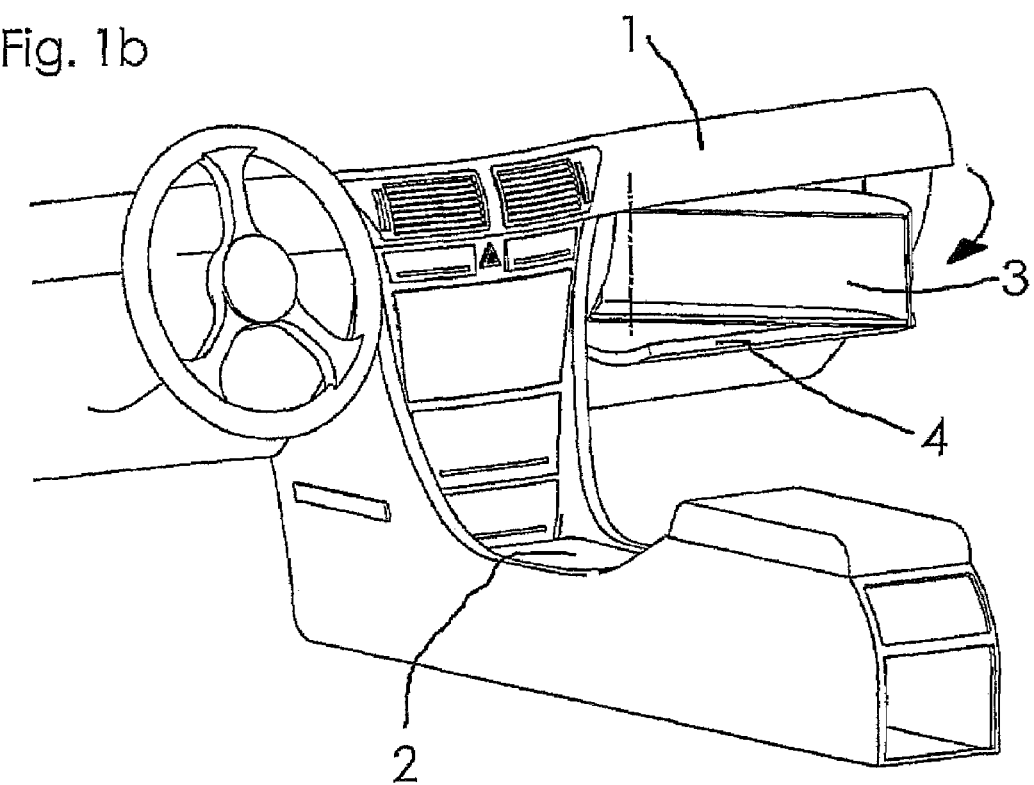

FIG. 1 shows a view of an instrument panel 1 and a central console 2 of a motor vehicle not otherwise shown. On the passenger side, that is to say on the right-hand side in the shown example of an embodiment, the instrument panel 1 has a glove compartment 3 according to the invention. The glove compartment 3 can be closed over by means of a hinged cover 4, which is shown open in the drawing. The glove compartment 3 is a box-shaped receptacle which is open to the side facing the interior space of the vehicle. In accordance with the invention, the glove compartment 3 has a pivotal mounting (not shown in the drawing), by means of which it can be pivoted from the home position shown in FIG. 1*a* into the position shown in FIG. 1*b*. In the position shown in FIG. 1*b*, the glove compartment 3 has been pivoted somewhat towards the driver's side and as a result the driver has better access thereto and a better view inside. The pivoting angle of the glove compartment 3 in the shown and described example of an embodiment of the invention is comparatively small; the glove compartment 3 cannot be pivoted to an extent such that the driver has a frontal view into it. Nevertheless, accessibility and the ability to see inside are considerably improved compared to a non-pivotable glove compartment. A larger pivoting angle of the glove compartment 3 is also within the scope of the invention. The hinged cover 4, when closed, holds the glove compartment 3 in its home position shown in FIG. 1*a*.

Figure 2A:
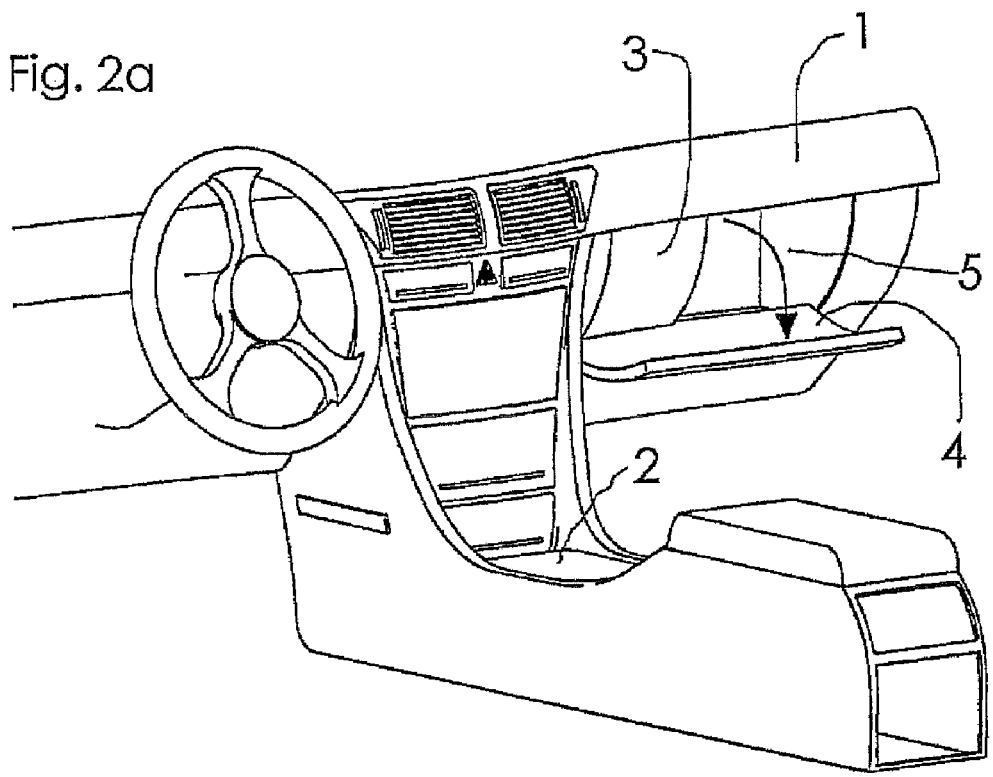
Figure 2B:
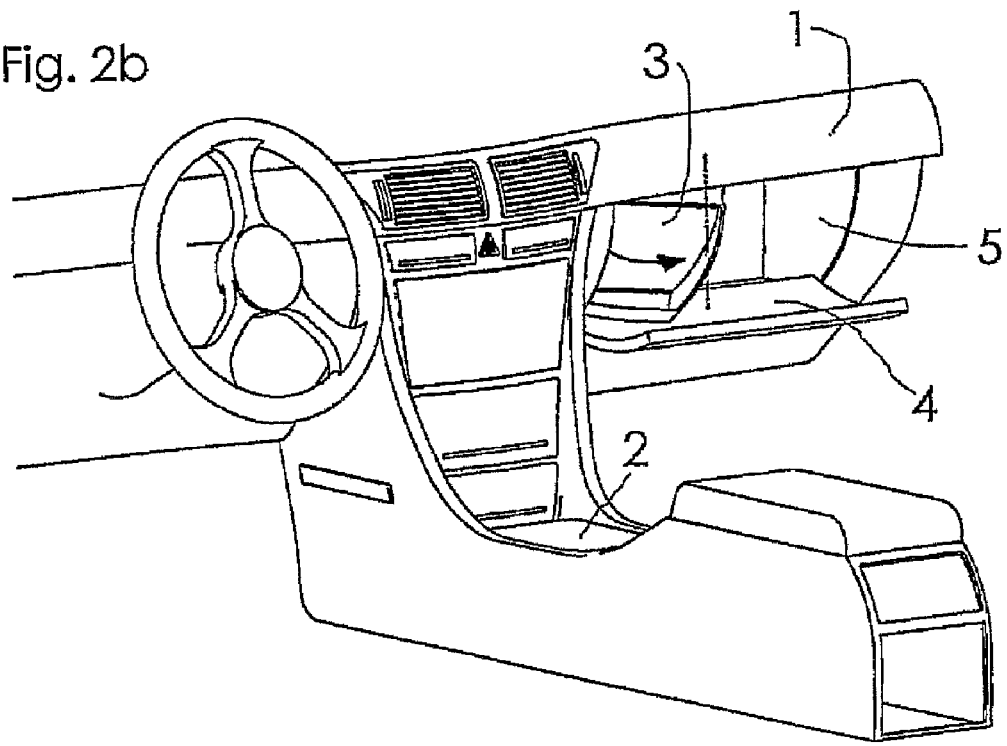

FIG. 2 shows a modified embodiment of the invention. In this case, the pivotable glove compartment 3 occupies just part of the width of the glove compartment as a whole—indicated in this case by the reference numeral 5. The glove compartment 3, 5 or the installation space for the glove compartment 3, 5 is sub-divided into a pivotable part 3 and a non-pivotable part 5. The parts 3, 5 can also be referred to as a pivotable glove compartment 3 and a fixed glove compartment 5. By means of a pivotal mounting (not shown in the drawing), the pivotable glove compartment 3 can be pivoted, as explained hereinabove with respect to FIGS. 1, towards the driver's side as can be seen in FIG. 2*b*. In the home position shown in FIG. 2*a*, the glove compartment 3, 5 as a whole, that is to say the pivotable part 3 and fixed part 5 thereof, can be closed over by means of the hinged cover 4.

For closing, the glove compartment 3 can be pivoted so that its opening faces the middle, that is to say is directed towards the central console 2 of the motor vehicle. This closed position is shown in FIG. 2a. The opening of the glove compartment 3 is covered by the central console 2 or another wall arranged within the instrument panel 1, so that the glove compartment 3 is closed and no articles can fall out. That side of the glove compartment 3 which is visible in the closed position in FIG. 2a forms the right-hand side of the glove compartment 3 when in the open position shown in FIG. 2b. In principle it is also possible, within the framework of the invention, for the glove compartment 3, starting from the open position facing the driver as shown in FIG. 2b, to pivot towards the outside, that is say with its opening facing away from the central console 2, into the closed position (not shown). In this case, the opening faces towards the fixed part 5 of the glove compartment and is preferably covered by a wall (not shown in the drawing) in the instrument panel 1. A larger pivot angle is also possible so that the opening of the glove compartment 3, when in the closed position, is directed away from the interior space and faces forwards relative to the motor vehicle (not shown).

Figure 3A:
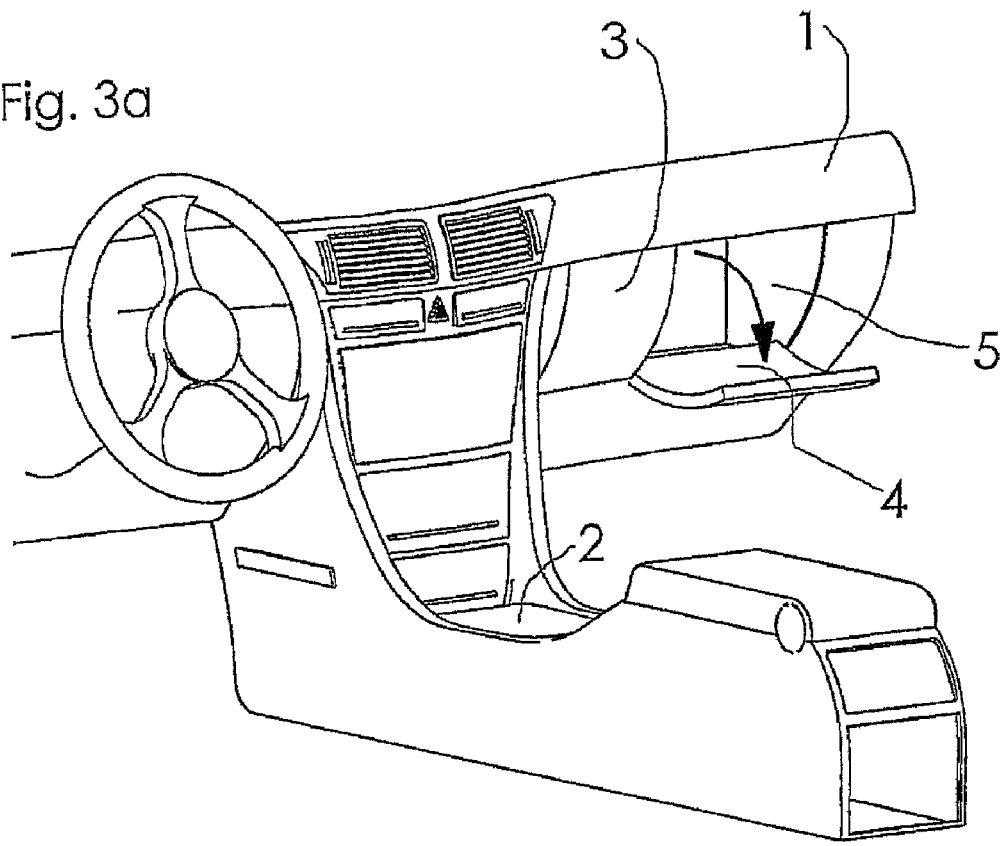
Figure 3B:
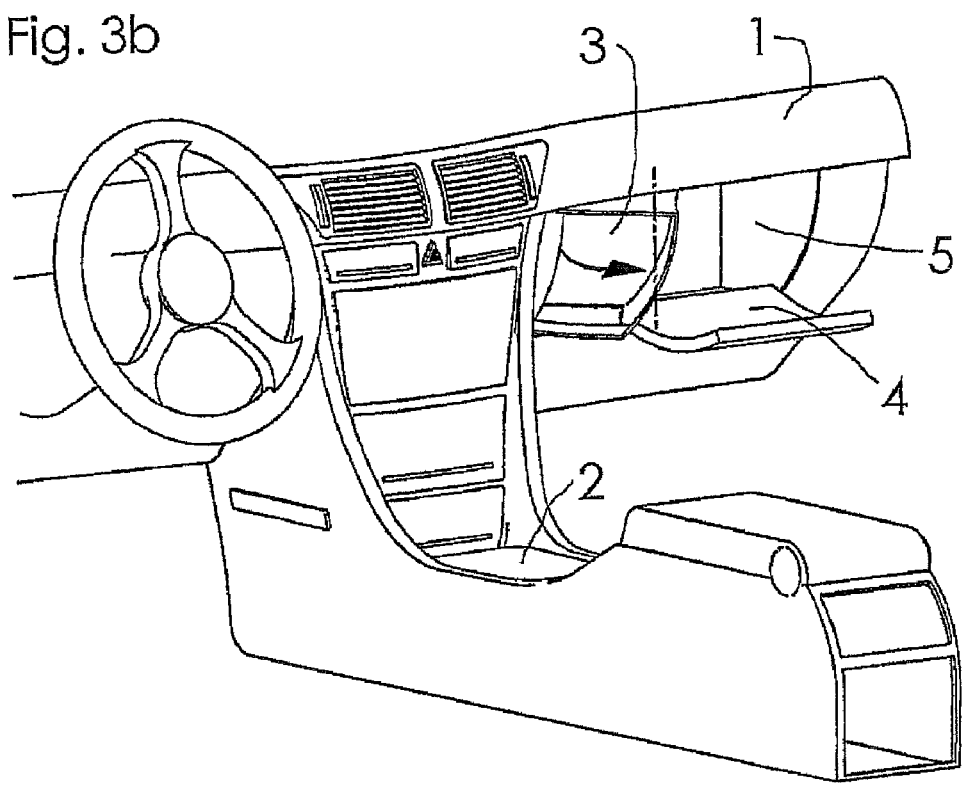

FIG. 3 shows a modification of the glove compartment 3, 5 of FIG. 2. In this case, the hinged cover 4 closes over only the fixed part 5 of the glove compartment 3, 5. The pivotable part of the glove compartment 3 can, as explained hereinbefore with respect to FIGS. 2a, b, be pivoted into a closed position as is shown in FIG. 3a.

The invention claimed is:

1. A glove compartment for a motor vehicle having a longitudinal axis, comprising a glove compartment element having a pivotal mounting and at least one part having an opening and pivotable sideways from a home position in which said opening of said at least one part of said glove compartment faces substantially toward a back of the motor vehicle at a passenger's side of the motor vehicle to a pivoted position in which said opening of said at least one part of said glove compartment element faces transversely to the longitudinal axis of the motor vehicle substantially sideways of the motor vehicle toward a driver's side of the motor vehicle so as to provide access to said opening of said at least one part of said glove compartment by a driver.

2. A glove compartment for a motor vehicle as defined in claim 1, wherein said at least one part of said glove compartment element is pivotable back into said home position in which an opening of said at least one part of said glove compartment is inaccessible from an interior space of the motor vehicle.

3. A glove compartment for a motor vehicle as defined in claim 2, wherein said at least one part of said glove compartment element is configured so that it is pivoted into said home position, which is a closed position, into an instrument panel of the motor vehicle.

4. A glove compartment for a motor vehicle having a longitudinal axis, comprising a glove compartment element having a pivotal mounting and at least one part pivotable sideways from a home position in which said at least one part of said glove compartment faces substantially toward a back of the motor vehicle at a passenger's side of the motor vehicle to a pivoted position in which said at least one part of said glove compartment element faces transversely to the longitudinal axis of the motor vehicle substantially sideways of the motor vehicle toward a driver's side of the motor vehicle so as to provide access thereto by a driver, wherein said at least one part of said glove compartment element is a pivotable part, said glove compartment element also has a fixed part which is not pivotable.

5. A glove compartment for a motor vehicle as defined in claim 1, further comprising a cover by which said glove compartment element is closable over.

6. A glove compartment for a motor vehicle as defined in claim 4, wherein said at least one part which is a pivotable part is closable.

7. A glove compartment for a motor vehicle as defined in claim 4, further comprising a cover by which said fixed part of said glove compartment element is closable.

* * * * *